United States Patent [19]

Fischer, Jr. et al.

[11] Patent Number: 4,585,628

[45] Date of Patent: Apr. 29, 1986

[54] STRIPPING METALS FROM SPENT CATALYSTS

[75] Inventors: Robert G. Fischer, Jr., Fairfield; Cynthia A. Van Savage, Ridgefield, both of Conn.

[73] Assignee: American Cyanamid Company, Stamford, Conn.

[21] Appl. No.: 679,964

[22] Filed: Dec. 10, 1984

Related U.S. Application Data

[63] Continuation-in-part of Ser. No. 481,136, Apr. 1, 1983, abandoned.

[51] Int. Cl.$^4$ .................. C01G 55/00; C01G 39/00; C01G 51/00; C01G 53/00

[52] U.S. Cl. .................. 423/22; 75/101 R; 75/119; 75/121; 423/49; 423/53; 423/68; 423/150; 502/24; 502/25; 502/26; 502/116

[58] Field of Search .................. 502/24-26, 502/28, 29, 516, 23, 30; 260/429 K; 423/42, 49, 53, 54, 68, 150, 22; 75/101 R, 119, 121

[56] References Cited

U.S. PATENT DOCUMENTS

| | | | |
|---|---|---|---|
| 2,406,960 | 9/1946 | Neal et al. | 260/429 K |
| 2,640,834 | 6/1953 | Tewksbury, Jr. et al. | 549/69 |
| 3,121,693 | 2/1964 | Michalko | 502/516 |
| 3,567,433 | 3/1971 | Gutnikov | 423/68 |
| 3,985,854 | 10/1976 | Bradford et al. | 423/22 |
| 4,280,897 | 7/1981 | Shah et al. | 252/412 |
| 4,343,774 | 8/1982 | Tilley | 423/53 |

*Primary Examiner*—P. E. Konopka
*Attorney, Agent, or Firm*—Gordon L. Hart

[57] ABSTRACT

Spent catalysts are extracted for removal of catalytic metals from inert supports by oxidizing subvalent metals in a solution of a ligand which forms a soluble stable complex with the oxidized metal. The ligands are salts of 1,1-dithiolate, dithiocarbimate and dithiocarbamate dianions for extraction in water and of dithiocarbamate monoions for extraction in organic solvents.

11 Claims, No Drawings

STRIPPING METALS FROM SPENT CATALYSTS

This is a continuation-in-part of previously filed application Ser. No. 481,136, filed Apr. 1, 1983, now abandoned.

The invention relates to improvements in the separation and recovery of metal values from spent refinery catalysts and other catalysts on inert supports. More particularly, the invention provides means and methods for separation of metals from alumina or other catalyst support material by means of solutions of organic ligands which solubilize and extract the metals.

Catalysts comprising catalytic metals supported on alumina or other catalyst support material are used extensively in petroleum refining and other industries. Catalysts for hydrotreating oils for removal of sulfur and nitrogen, and sometimes metal impurities, from the oil will usually comprise molybdenum with cobalt or nickel on alumina supports. The spent hydrotreating catalysts still contain much of their original content of the catalytic metals and may also contain significant amounts of vanadium, nickel or other metals which have been deposited from heavy oils during the hydrorefining process. Other catalysts may contain one or more catalytic metals worth recovering, such as rhodium, rhenium, platinum, palladium, ruthenium, etc. Such metals may be supported singly or in various combinations of metals on supports for use in refinery processes such as catalytic reforming of petroleum fractions, and in other chemical processing. Also, catalysts for catalytic conversion of engine exhausts may contain platinum and palladium on alumina supports.

The spent catalysts are of little value unless the metal values can be extracted and recovered. An object of the invention is to provide improved means and methods for removal of such metals from the catalyst support by solvent extraction using solutions of certain organic ligands.

The invention employs the ability of 1,1-dithiolate, dithocarbimate or dithiocarbamate dianions and mono anions as ligand to coordinate, oxidize and solubilize a subvalent metal i.e. polyvalent metal in a valence state lower than its highest valence state, including the zero-valent metal. These ligands are effective to solubilize even some noble metals such as platinum. Solvents for use with the ligands for solubilizing the metals include water and some organic solvents.

Useful 1,1-dithiolate dianions are characterized by the structure:

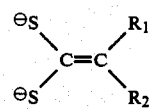

Dithiocarbimate dianions are characterized by the structure:

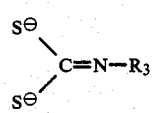

Dithiocarbamate dianions are characterized by the structure:

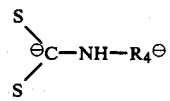

Dithiocarbamate mono anions are characterized by the structure:

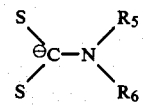

In the formula I above $R_1$ and $R_2$ are atoms or radicals which together provide an electron withdrawing effect sufficient to stabilize the dithiolate dianionic function. Such electron withdrawing functional groups include: nitro, cyano, alkoxy, cycloalkoxy, aryloxy, alkaryloxy, substituted aryloxy; amido, monoalkyl and dialkylamido, mono- and diarylamido, mono- and dialkarylamido, mono- and di(substituted aryl)amido, aryl, alkyl diamido, alkylcarbonyl, haloalkylcarbonyl, cycloalkylcarbonyl, arylcarbonyl, alkarylcarbonyl, and substituted arylcarbonyl, alkoxycarbonyl, cycloalkoxycarbonyl, aryloxycarbonyl, alkaryloxycarbonyl, substituted arylcarbonyl; and when one of $R_1$ and $R_2$ is nitro or cyano, the other may be H, alkyl, or aryl.

In the formula II above, $R_3$ may be cyano or aryl.

In the formula III above $R_4{}^{63}$ is an aromatic radical which comprises an anionic functional group.

In the formula IV above, $R_5$ and $R_6$ are each selected from hydrogen, alkyl, aryl or $R_5R_6$ together may form a heterocyclic ring.

Specific salts of dianions having the formula I above include:

| Chemical Names | ACRONYM |
| --- | --- |
| dipotassium 2,2-dicyanoethylene-1,1-dithiolate | $K_2$i-MNT |
| dipotassium 2-cyano-2-carboethoxy-ethylene-1,1-dithiolate | $K_2$CED |
| dipotassium 2,2-dicarboethoxy-ethylene-1,1-dithiolate | $K_2$DED |
| dipotassium 2,2-dicarbamoyl-ethylene-1,1-dithiolate | $K_2$DCMD |
| dipotassium 2-nitroethylene-1,1-dithiolate | $K_2$NED |
| dipotassium 2,2-diacetylethylene-1,1-dithiolate | $K_2$DAED |
| dipotassium 2-acetyl-2-carboxy-ethylene-1,1-dithiolate | $K_2$ACED |

A preferred dithiocarbimate dianion for use in the invention is the dianion of the formula II above in which $R_3$ is cyano. Preferred salts are the dipotassium and disodium N-cyanodithiocarbamates (Acronyms $K_2$CDC and $Na_2$CDC).

Some preferred dithiocarbamate dianions for use in the invention are dianions of the formula III above wherein $R_4{}^\ominus$ is p-carboxyphenol or methyl-phenoxy. Salts of anions having those formulas include:

dipotassium N—p-carboxyphenyldithiocarbamate

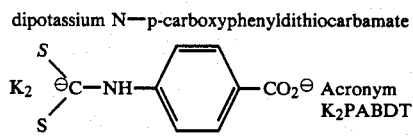

Acronym $K_2$PABDT

-continued
and dipotassium N—m-phenoxydithiocarbamate

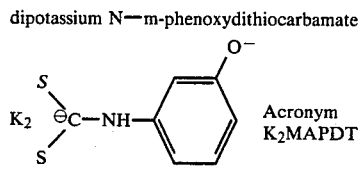

Acronym
K₂MAPDT

Some preferred dithiocarbamate monoions having the formula IV above include dialkylammonium N,N-dialkyldithiocarbamate wherein alkyl is ethyl or propyl.

For the purpose of describing the invention we may use the term "1,1-dithiolate" herein to define the class of compounds comprising any of the dianion and monoion structures shown above. Specific compounds may be referred to herein by their acronyms. Any water soluble salt of the 1,1-dithiolate dianions may be used for the metal extraction in water solvent. Salts having alkali metal or alkylammonium cations are especially preferred. Dialkylammonium salts of dithiocarbamate monoanions are useful for extractions using organic solvents.

Disodium N-cyanodithiocarbimate salts are known and can be prepared as described by J. P. Fackler, Jr. and D. Coucouvanis, *J. Amer. Chem. Soc.*, 1966, 88, 3913. Cyanamid is heated in water with sodium hydroxide and carbon disulfide at reflux for about two hours.

Other 1,1-dithiolates are known and can generally be prepared following descriptions in D. N. Coucouvanis, Ph.D thesis, Case Inst. of Technology, Cleveland, 1967 and references cited therein. Some specific preparations are outlined below.

K₂CED was prepared by adding pulverized KOH (0.2 moles) to dioxane (100 mls) in a flask with stirrer, condenser, thermometer, and addition funnel. Ethyl cyanoacetate (0.1 moles) and CS₂ (0.1 moles) were mixed with dioxane (50 mls) and placed in the addition funnel. The solution was added dropwise, maintaining the temperature between 15° and 20° C. A yellow precipitate formed almost immediately. Ater addition was complete, the mixture was stirred for 30 minutes and then diluted with 250 mls ether. The yellow solid was filtered (suction), washed with ether and dried in vacuo. The yield is nearly quantitative.

K₂DED, K₂ACED and K₂iMNT were prepared as above using 0.1 moles of diethyl malonate, ethyl acetoacetate, and malononitrile, respectively. The first two are yellow solids and were obtained in high yields. K₂iMNT is sandy colored.

Stoichiometric quantities of acetylacetone, KOH, and CS₂ were used to prepare 0.1 moles of K₂ DAED. The reagents were mixed in a flask with 122.5 mls H₂O and stirred for 1 hour, which produced a clear red solution. K₂DCMD was made similarly using 0.1 moles malonamide and resulting in an orange solution.

Nitromethane (0.66 moles), CS₂ (2.1 moles) and 100 mls absolute ethanol were used to prepare K₂NED. To this mixture was added a solution of KOH (1.22 moles) in 250 mls ethanol, maintaining the temperature between 27° and 41° C. with an ice bath. A brick colored precipitate was filtered after holding the mixture at 36° C. for 45 minutes.

K₂PABDT and K₂MAPDT were prepared by adding 0.1 moles p-aminobenzoic acid or m-aminophenol to 150 mls H₂O containing 0.1 moles each KOH and CS₂. The solutions were stirred overnight, and another 0.1 moles KOH added resulting in clear orange solutions.

Dialkylammonium N,N-dialkyl dithiocarbamates were prepared in hexanes by addition of CS₂ to a solution of either diethylamine or dipropylamine. A white precipitate formed almost immediately and was recovered by filtration. Tetrapropylthiuramidisulfide was made via stoichiometric iodine oxidation of the dithiocarbamate in CHCl₃. The oil was isolated by stripping off the solvent. The product crystallized on standing. Tetramethylthiuramdisulfide was obtained from a commercial source.

For use in extraction of metals in accordance with the invention, a selected 1,1-dithiolate salt is dissolved in the extracting solvent and may be partially oxidized to produce an oxidized species. The oxidized species is necessary for the extraction when oxygen is not present during the extraction. We are uncertain about the structure of the oxidized species except thiuramdisulfides which are the oxidized dithiocarbamates; several possible structures, illustrated with specific reference to Na₂CDC, are

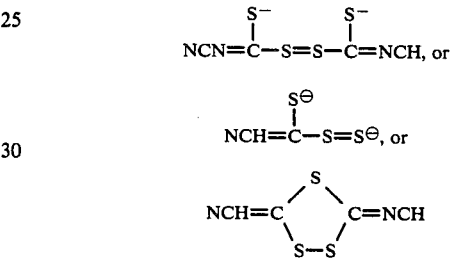

We may use two distinct methods for oxidizing and extracting metals with 1,1-ditholate salts. In both methods the metal is oxidized to a higher oxidation state and forms a soluble complex with the ligand. In one method, a portion of the ligand salt in solution is oxidized by means of H₂O₂ before contacting the solution of partially oxidized ligand salt with the catalyst to be extracted. In another method a solution of the salt is contacted with the catalyst solids to be extracted and oxygen is passed through the liquid during the extraction.

The proportion of the oxidized species of the selected ligand to the non-oxidized species in a solution to be used for extraction can be varied from about 1:5 to about 5:1. When oxygen is present while the ligand salt solution contacts the catalyst, there is no need to oxidize the salt before extraction. It is possible that oxidation of the metals may occur by use of oxygen in combination with a solution of the ligand and with no oxidized species of the ligand present in the solution.

The proportion of ligand to solvent in the solution to be used for metal extraction is preferably at or near the limit of solubility of the ligand salt in the solvent. Using water as solvent, we prefer to use solutions of about 20-25% by wt of the ligand salt for the extraction.

For demonstrating oxidation and extraction of metals using a solution of the ligand that has been partially oxidized before the extraction, we make solutions in which about 1/6 to about ⅝ of the ligand present has been oxidized. A convenient way to control the proportion of oxidized to unoxidized ligand in the solution is to prepare one solution of completely oxidized ligand and then blend it to make the proportions wanted, with a solution of ligand that has not been oxidized. The completely oxidized ligand solution is prepared by gradually adding a 30% H₂O₂ solution to an aqueous ligand solution, until about 1.5 mole H₂O₂ per mole of ligand has been added. Some cooling may be necessary to remove heat of reaction.

A ligand solution which contains only the oxidized species will not be very effective for the oxidation and extraction by either method. A solution containing no oxidized ligand salt will not be effective for the metals extraction unless oxygen is also present during the extraction.

Ligand solutions for use when oxygen is present during the extraction do not need to be partially oxidized prior to use, and are most conveniently prepared simply by dissolving the ligand salt in the solvent.

To prepare a spent catalyst for extraction, it is preferable to grind the catalyst particles to facilitate the liquid-to-solids contact during extraction. It is preferable to wash any hydrocarbons present from the catalyst, using an organic solvent but it is not necessary. The catalyst metals to be extracted may be present as metal subsulfides or suboxides or other subvalent species or as elemental metals in the catalyst.

A stoichiometric excess of the ligand to the metals to be extracted is preferred. One stoichiometric ligand equivalent to form the soluble, stable ligand metal complexes is assumed to be two moles of ligand per mole of metal for solubilizing palladium, platinum, molybdenum, vanadium and nickel, and three moles of ligand per mole of metal for solubilizing rhenium, rhodium, ruthenium and cobalt.

The invention will be described in more detail by reference to the following detailed specific examples which include our presently most preferred mode for carrying out the invention.

EXAMPLE 1

Aqueous solutions of 20 wt% Na₂CDC ligand were prepared, with 1/6, ⅓ and ⅔ of the ligand oxidized in respective solutions, by combining the respective proportions of a solution of completely oxidized ligand prepared as described above with a solution of the unoxidized ligand.

Samples of catalyst to be extracted were prepared by grinding spent catalyst taken from a hydrodesulfurization reactor. The catalyst had been washed with xylene to remove residual hydrocarbons before grinding. The measuring content of catalyst metals in the spent catalyst was as follows, expressed as percent by wt of the catalyst wt.: Co 1.45%; Mo 3.74; Ni 2.68; V 10.91%. The catalyst support material was essentially alumina. For each test, a sample of the ground catalyst weighing about 1 gram was placed in a 50 ml round bottom flask and enough of the selected ligand salt solution was added to provide a multiple of more than one stoichiometric ligand equivalent for the metals to be extracted.

The stoichiometric ligand equivalent for the measured amount of each catalyst metal in the catalyst sample was calculated, and the total of those was regarded as one stoichiometric ligand equivalent for complexing all of the catalytic metals in that catalyst sample. For best results we prefer to use an excess over one such stoichiometric ligand equivalent in solution contacting the catalyst sample. The total amount of ligand used may be expressed as multiples of one calculated stoichiometric ligand equivalent for the catalyst sample.

To carry out an extraction, the ligand solution was refluxed in the flask, in contact with the catalyst for a selected time. The solution was then separated from the solids and analyzed to determine the amount of each metal extracted.

The results of several such extractions are tabulated in Table I, which also shows the proportion of oxidized to unoxidized ligand in each ligand solution used, the multiples of one stoichiometric ligand equivalent that were used for each sample, and the percent of total metal extracted for each of the catalytic metals in the catalyst, as determined by analysis of the solution after extraction.

TABLE I

Extraction of Hydrotreating Catalyst with 20% Na₂CDC and its Oxidation Product

| Run No. | % Sol'n Oxidized | Ligand Equivalents Used | Hrs. Refluxed | V | Mo | Ni | Co |
|---|---|---|---|---|---|---|---|
| 1 | ⅓ | 10.0 | 18 | 35 | 100 | 60 | 100 |
| 2 | ⅓ | 1.1 | 17 | 14 | 60 | 0 | 0 |
| 3 | ⅔ | 1.1 | 67 | 15 | 55 | 0 | <1 |
| 4 | 1/6 | 2.0 | 18 | 13 | 51 | 2 | 9 |
| 5 | ⅓ | 2.0 | 18 | 11 | 49 | 20 | 51 |

In the hydrotreating catalysts that were used the cobalt and molybdenum values were assumed to be present as metal subsulfides; the nickel and vanadium compounds were of undetermined composition.

EXAMPLE 2

The catalyst samples to be treated were prepared the same and were of the same composition as those described in Example 1, except where otherwise noted. The ligand solutions were 20% by wt Na₂CDC aqueous solution except where otherwise noted. None of the solutions were oxidized prior to use. Tubular glass reactors of three sizes were employed for the several runs. These vertical tubular reactors are fitted at the bottom with glass frits for admission of an oxygen feed. All of the reactors were fitted with baffles and reflux condensers. The reactor volumes were 80 ml, 700 ml and 1700 ml. The larger reactors had steam jackets and were fitted with vertical stirring rods with three sets of paddles which were operated during the runs in those reactors. The small reactor was immersed in an oil bath for temperature control.

The reactors were loaded with a catalyst sample and with an amount of ligand solution to provide multiples of one stoichiometric ligand equivalent for each sample as shown in Table II. For each run, the reactors were operated for the time shown and at the temperature shown in Table II with a constant flow of oxygen through the reactor at the maximum practical flow.

Temperature in the reactors was controlled by use of the oil bath or the steam jacket. At the end of each run, the liquid was separated and analyzed for content of catalytic metals extracted. The amount of each metal found is reported in Table II for each run, expressed as the percent extracted of the total amount of each metal in the catalyst sample used.

TABLE II

Extraction of Hydrotreating Catalyst with 20% Na₂CDC in Presence of Oxygen

| Run No. | Ligand Equivalents Used | Reactor Capacity | T Max. °C. | Hrs. at T Max | % Extracted | | | |
|---|---|---|---|---|---|---|---|---|
| | | | | | V | Mo | Ni | Co |
| 1 | 10.6 | 80 ml | 40–44 | 1.0 | 30 | 53 | 54 | 55 |
| 2 | 5.3 | 80 ml | 42–49 | 3.2 | 36 | 61 | 46 | 53 |
| 3 | 10.6 | 80 ml | 40–43 | 2.5 | 39 | 60 | 59 | 62 |
| 4 | 2.1 | 80 ml | 35–36 | 4.2 | 28 | 55 | 34 | 64 |
| 5 | 1.1 | 80 ml | 81–85 | 3.5 | 20 | 58 | 23 | 54 |
| 6 | 1.5 | 80 ml | 85–89 | 3.5 | 24 | 55 | 9 | 53 |
| 7 | 0 | 80 ml | 70 | 3.1 | 10 | 17 | 57 | 69 |
| 8 | 10.6 | 80 ml | 77–79 | 3.5 | 60 | 61 | 17 | 67 |
| 9 | 10.6 | 80 ml | 42–53 | 4.5 | 37 | 25 | 40 | 30 |
| 10 | 1.1 | 80 ml | 95–98 | 5.1 | 28 | 32 | 9 | 18 |
| 11 | 1.5 | 80 ml | 78–81 | 5.1 | 38 | 34 | <1 | 3 |
| 12 | 1.5 | 700 ml | 75–95 | 2.0 | 23 | 40 | 42 | 57 |
| 13 | 1.5 | 700 ml | 75–95 | 1.0 | 29 | 52 | 43 | 59 |
| 14 | 1.5 | 700 ml | 75–95 | 4.2 | 26 | 59 | 7 | 43 |
| 15 | 0 | 700 ml | 75–95 | 4.5 | 12 | 11 | 64 | 71 |
| 16 | 1.5 | 700 ml | 75–95 | 2.2 | 53 | 63 | 55 | 63 |
| 17 | 1.5 | 700 ml | 75–95 | 4.7 | 38 | 60 | 7.5 | 17 |
| 18 | 3.8 | 1700 ml | 75–95 | 3 | 52 | 64 | 4 | 6 |
| 19 | 3.8 | 1700 ml | 75–95 | 2.5 | 48 | 62 | 8 | 2 |
| 20 | 0 | 1700 ml | 75–95 | 3 | 25 | 29 | 80 | 81 |
| 21 | 3.8 | 1700 ml | 75–95 | 4.8 | 48 | 53 | 17 | 39 |

Notes to Table II
(a) In Runs 7, 15 and 20 water was used instead of a ligand solution.
(b) In Runs 8 and 14 a 23 wt % K₂CDC aqueous solution was the ligand solution.
(c) In Runs 1, 8 and 13–16 the catalyst was washed and ground.
(d) In Runs 17–20 the catalyst was washed and ground and sieved to remove particles less than 44μ.
(e) In Runs 9–12 the catalyst was ground without washing.
(f) In Run 21 the catalyst was ground without washing and sieved to remove particles less than 250μ.

To test the ligands for use in extraction of precious metals, catalysts having the following precious metal contents on alumina supports were selected:

| Catalyst No. | Nominal Composition | Precious Metal Content wt % by analysis |
|---|---|---|
| 1 | 5% Pd/Al₂O₃ | 4.78% Pd |
| 2 | 5% Pt/Al₂O₃ | 4.74% Pt |
| 3 | 5% Rh/Al₂O₃ | 5.65% Rh |
| 4 | 2% Ru/Al₂O₃ | 1.83% Ru |
| 5 | Pt/Re Reforming Catalyst | .263% Pt .267% Re |
| 6 | Pd/Pt Auto Exhaust Catalyst | .042% Pd .042% Pt |

Catalyst Nos. 1–3 were obtained commercially on powdered alumina. Catalyst Nos. 5 and 6 were obtained on pelleted alumina and were ground to powders. Catalyst No. 4 was prepared in our laboratories.

EXAMPLE 3

Ligands identified in Table III were used to prepare ligand solutions having the same molarity as the 20% by wt. Na₂CDC solution and having ⅔ of the ligand oxidized to the ligand oxidation product. These solutions were prepared as described in Example 1, using the other ligands instead of Na₂CDC. Each catalyst identified in Table III was extracted with the partially oxidized ligand solutions of each of the ligands identified, using the same extraction apparatus described in Example 1. For each extraction a one-gram sample of the catalyst was extracted using an amount of the partially oxidized ligand solution that would provide the number of stoichiometric ligand equivalents shown in Table III, at reflux temperature for about 16 hours (overnight). The residue was separated from the solution by filtration and then extracted again by the same procedure using a new ligand solution in the same amount. The two solutions were combined and analyzed for extracted metal content. The solid extraction residue was also analyzed for residual metal content.

From the analytical results, the percentage of the total metal content extracted was calculated for each catalytic metal in the catalyst. The results, as calculated separately using the solution analysis and the residue analysis, are shown in Table III.

TABLE III (H₂O₂) Precious Metal Extraction with Oxidized Ligands

| Catalyst | Ligand | Stoichiometric Ligand Equivalents Used | Percent of Total Metal Extracted | |
|---|---|---|---|---|
| | | | by Solution Analysis | by Residue Analysis |
| 5% Pd/Al₂O₃ | K₂iMNT | 24 | 93 | 99.97 |
| | K₂iMNT | 2.4 | 82 | 75 |
| | K₂iMNT | 24 | 88 | 76 |
| | K₂CED | 24 | 97.5 | 98.5 |
| | Na₂CDC | 24 | 84 | 87 |
| | Na₂CDC | 2.4 | 58 | 56 |
| | K₂ACED | 24 | 80 | 86 |
| | K₂NED | 24 | 79 | 71 |
| | K₂DAED | 24 | 62 | 66 |
| | K₂DCMD | 24 | 3 | 0 |
| | K₂MAPDT | 24 | 82 | 85 |
| | K₂PABDT | 24 | 44 | 62 |
| 5% Pt/Al₂O₃ | K₂iMNT | 44 | 72 | 59 |

TABLE III-continued (H₂O₂)
Precious Metal Extraction with Oxidized Ligands

| Catalyst | Ligand | Stoichiometric Ligand Equivalents Used | Percent of Total Metal Extracted | |
|---|---|---|---|---|
| | | | by Solution Analysis | by Residue Analysis |
| 5% Pt/Al₂O₃ | K₂iMNT | 4.4 | 32 | 34 |
| | K₂iMNT | 44 | 32 | 18 |
| | K₂CED | 44 | 57 | 52 |
| | Na₂CDC | 44 | 19 | 23 |
| | Na₂CDC | 4.4 | 21 | 11 |
| | K₂ACED | 44 | 22 | 16 |
| | K₂NED | 44 | 42 | 30 |
| | K₂DAED | 44 | 21 | 6 |
| | K₂DCMD | 44 | 9 | 2 |
| | K₂MAPDT | 44 | 21 | 11 |
| | K₂PABDT | 44 | 15 | 4 |
| 5% Rh/Al₂O₃ | K₂iMNT | 39 | 13 | 79 |
| | Na₂CDC | 39 | 26 | 27 |
| 2% Ru/Al₂O₃ | K₂iMNT | 117 | 87 | 52 |
| | Na₂CDC | 117 | 31 | 53 |

| | | | Pt | Re | Pt | Re |
|---|---|---|---|---|---|---|
| Pt/Re | K₂iMNT | 790 | 109 | 102 | 96 | 98 |
| Reforming | K₂iMNT | 79 | 104 | 97 | 92 | 90 |
| Catalyst | K₂CED | 790 | 101 | 99 | 92 | 93 |
| | Na₂CDC | 790 | 68 | 80 | 70 | 79 |
| | Na₂CDC | 79 | 9 | 72 | 30 | 81 |

| | | | Pd | Pt | Pd | Pt |
|---|---|---|---|---|---|---|
| Pd/Pt Auto | K₂iMNT | 3500 | 128 | 94 | 13 | 69 |
| Exhaust | K₂CED | 3500 | 63 | 49 | 38 | 41 |
| Catalyst | Na₂CDC | 3500 | 48 | 12 | 37 | 108 |

EXAMPLE 4

Two of the precious metal catalysts were treated for extraction by ligands in the presence of oxygen by the procedure described in Example 2. The ligand solutions used were a 20% by wt Na₂CDC aqueous solution ad equimolar solutions of the other ligands. Shown in Table IV are the catalysts treated, the ligands used for each catalyst, the amount expressed in multiples of one stoichiometric ligand equivalent of the ligand used for each extraction and the percent of total catalyst metal extracted, as calculated from respective analyses of the solution and the catalyst residue, for each metal extracted. The temperatures for extraction of the 5% Pd catalyst were 70°–80° C. with KiMNT and 90°–100° C. with Na₂CDC and K₂DED. For both extractions of the auto exhaust catalyst the temperatures were 95°–100° C.

TABLE IV (O₂)
Precious Metal Extraction with Oxygen Present

| Catalyst | Ligand | Stoichiometric Ligand Equivalents Used | Percent of Total Metal Extracted | | | |
|---|---|---|---|---|---|---|
| | | | by Solution Analysis | | by Residue Analysis | |
| 5% Pd/Al₂O₃ | K₂iMNT | 24 | 90 | | 100 | |
| | Na₂CDC | 48 | 101 | | 72 | |
| | K₂DED | 24 | 44 | | 40 | |
| Pd/Pt Auto | K₂iMNT | 3500 | 73 Pd | 65 Pt | 41 Pd | +100 Pt |
| Exhaust Catalyst | Na₂CDC | 3500 | 91 Pd | 17 Pt | 47 Pt | 22 Pt |

The foregoing examples demonstrate the use of aqueous dianion ligand solutions for solvent extraction of catalytic metals from alumina-supported catalysts. Catalyst metals on other inert supports can be similarly extracted. Some of the metals can be precipitated from the extract solutions by addition of strong alkali or mineral acids. For example, cobalt and nickel are precipitated from the HDS catalyst extracts by addition of 10% NaOH. Further treatment of the filtrate with acetic acid to remove organic precipitates followed by a strong H₃PO₄ treatment for precipitation of vanadium, leaves a filtrate containing most of the molybdenum.

Organic solvents may be used instead of water as solvent for salts of 1,1-dithiocarbamate monoanions, and those solutions can be used for extraction of the catalytic metals from their inert supports. This may be preferred in some processes to facilitate the recovery of metals from the extract solution.

EXAMPLE 5

To demonstrate extractions using organic solvents instead of water, the ligands selected were:

dipropylammonium N,N-dipropyldithiocarbamate (DPDPC) which was used with all of the organic solvents listed in Table V except chloroform, and diethylammonium N,N-diethyldithiocarbamate (DEDEC) which was used with chloroform. The oxidized ligands were prepared by stoichiometric oxidation with iodine in the solvents and were blended with the non-oxidized ligand to make a mixture in which the ligand was oxidized. The partly oxidized ligands were dissolved in the solvents in amounts to provide 24 stoichiometric ligand equivalents of the ligand in the extracting solution which contacts each sample of catalyst solids. The extractions were made using 25 grams of extraction solution with one gram of the catalyst. The solution was refluxed while contacting the catalyst in the apparatus described in Example 1, for about 16 hours and then separated from the solids which were then extracted a second time by the same procedure using a fresh ligand salt solution of the same composition and in the same amount as that used for the first extraction. The two extract solutions separated from the solids were combined and analyzed for catalytic metals content. The catalyst residue solids were also analyzed. Shown in Table V are the calculated percentage of total catalytic metal extracted, as calculated separately from the results of analysis of the extract solution and analysis of the solids residue.

TABLE V

Precious Metals Extraction Using Organic Solvents

| Catalyst | Organic Solvent | Ligand | Percent of Total Metal Extracted | |
| --- | --- | --- | --- | --- |
| | | | by Solution Analysis | by Residue Analysis |
| 5% Pd/Al$_2$O$_3$ | Chloroform | DEDEC | 18 | 43 |
| | Toluene | DPDPC | 118 | 99.63 |
| | Tetrahydrofuran | DPDPC | 92 | 96.42 |
| | Acetonitrile | DPDPC | 88 | 99.74 |
| 5% Pt/Al$_2$O$_3$ | Chloroform | DEDEC | 44 | 42 |
| | Toluene | DPDPC | 28 | 26 |
| | Tetrahydrofuran | PPDPC | 24 | 21 |

We claim:

1. A method of extracting subvalent catalyst metal from spent catalyst which comprises subvalent catalyst metal on inert catalyst support material, by means of a ligand selected from salts of 1,1-dithiolate dianions, dithiocarbimate dianions, dithiocarbamate dianions and dithiocarbamate monoions, said method comprising oxidating the subvalent catalyst metal to a higher valence state by contacting the catalyst with either:
   a. a solution of the selected ligand and an oxidized species of the same ligand in proportions in the range from 1:5 to 5:1 of the ligand to its oxidized species, in a solvent for the ligand and its oxidized species and for the metal complex that is formed by reaction of the ligand with the oxidated catalyst metal; or
   b. a solution of the selected ligand in a solvent for the ligand and for the metal complex that is formed by reaction of the ligand with the oxidated catalyst metal, and simultaneously also contacting the catalyst and ligand with oxygen in amount sufficient for oxidating the catalyst metal to a higher valence state;

whereby the catalyst metal is oxidated to a higher valence state which is complexed by the ligand and the resulting complex is dissolved by the solvent.

2. A method defined by claim 1, wherein the solvent is water and the selected salt is a dipotassium or disodium salt of a 1,1-dithiolate dianion.

3. A method defined by claim 1 wherein the solvent is water and the selected salt is a disodium or dipotassium salt of a dithiocarbimate dianion or a dithiocarbamate dianion.

4. A method defined by claim 3 wherein the salt is selected from disodium and dipotassium salts of N-cyanodithiocarbamate dianion.

5. A method defined by claim 1 wherein the metals extracted comprise at least one metal selected from palladium, platinum, molybdenum, vanadium, nickel, rhenium, rhodium, ruthenium and cobalt.

6. A method defined by claim 5 wherein the catalyst support material is alumina.

7. A method defined by claim 6 wherein the metals comprise molybdenum with at least one of cobalt, nickel and vanadium and the catalyst is a spent hydrotreating catalyst.

8. A method defined by claim 6 wherein the metals comprise at least one of palladium, platinum, rhenium, rhodium and ruthenium.

9. A method defined by claim 8 wherein the solvent is an organic solvent and the complexing agent is a dialkylammonium salt of a dithiocarbamate monoanion.

10. A method defined by claim 1 wherein the metal is oxidized by reaction with an oxidized species of the complexing agent.

11. A method defined by claim 1 wherein the metal is oxidized in a solution of the complexing agent and with oxygen present.

* * * * *